(12) United States Patent
Wills et al.

(10) Patent No.: US 10,397,799 B2
(45) Date of Patent: *Aug. 27, 2019

(54) RADIO SIGNAL PATH DESIGN TOOL WITH GRAPHICAL DISPLAY TO FACILITATE SELECTION OF ALTERNATIVE RADIO ANTENNA SITES

(71) Applicant: Wireless Applications Corp., Bellevue, WA (US)

(72) Inventors: Eric Wills, Bellevue, WA (US); Abdelelah Salama, Bellevue, WA (US)

(73) Assignee: Wireless Applications Corp., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,948

(22) Filed: Apr. 27, 2018

(65) Prior Publication Data

US 2018/0295526 A1    Oct. 11, 2018

Related U.S. Application Data

(63) Continuation of application No. 15/947,643, filed on Apr. 6, 2018.

(Continued)

(51) Int. Cl.
| | | |
|---|---|---|
| *H04W 16/18* | (2009.01) | |
| *H04W 16/02* | (2009.01) | |
| *H04B 7/08* | (2006.01) | |
| *G06F 3/0481* | (2013.01) | |
| *H04W 16/22* | (2009.01) | |

(52) U.S. Cl.
CPC .......... *H04W 16/18* (2013.01); *H04B 7/0817* (2013.01); *H04W 16/02* (2013.01); *G06F 3/0481* (2013.01); *H04W 16/22* (2013.01)

(58) Field of Classification Search
CPC ..... H04W 16/18; H04W 16/02; H04W 16/22; H04B 7/0817; G06F 3/0481
See application file for complete search history.

(56) References Cited

U.S. PATENT DOCUMENTS

| | | | |
|---|---|---|---|
| 6,246,380 B1* | 6/2001 | Chow ................... | H04W 16/00 343/844 |
| 6,366,584 B1* | 4/2002 | Gulliford ................ | H04J 3/085 370/258 |

(Continued)

*Primary Examiner* — Un C Cho
*Assistant Examiner* — Shah M Rahman
(74) *Attorney, Agent, or Firm* — Perkins Coie LLP

(57) ABSTRACT

A radio signal path design tool that provides for a visual depiction of the viability of alternative antenna locations around proposed fixed antenna sites. The design tool computes a radio link path profile at the proposed antenna sites while simultaneously displaying alternative locations around the fixed antenna sites that would potentially achieve the radio link design goals. In some embodiments, the alternative antenna locations are represented as an array of points, arranged in a grid pattern, surrounding the proposed antenna sites. The path design tool may change each displayed point so that the point visually reflects the extent to which the corresponding location satisfies the radio link design goals. By providing a robust visualization, the design tool allows for a ready assessment of alternative radio link paths adjacent to the proposed link path, which allows for flexibility in deploying radio antennas.

20 Claims, 11 Drawing Sheets

Related U.S. Application Data

(60) Provisional application No. 62/483,202, filed on Apr. 7, 2017.

(56) References Cited

U.S. PATENT DOCUMENTS

| | | | | |
|---|---|---|---|---|
| 6,771,966 B1* | 8/2004 | Chow | H04W 16/18 | 455/446 |
| 8,233,423 B2* | 7/2012 | Watanabe | H04L 41/22 | 370/315 |
| 9,252,982 B2* | 2/2016 | Jobe | H04L 12/66 | |
| 9,262,851 B2* | 2/2016 | Sridharan | G06F 8/34 | |
| 9,479,943 B1* | 10/2016 | Ofir | H04W 16/18 | |
| 9,888,353 B2* | 2/2018 | Reed | H04W 8/02 | |
| 9,918,233 B2* | 3/2018 | Chaganti | H04W 24/08 | |
| 9,933,297 B2* | 4/2018 | Barnard | G01J 1/42 | |
| 2002/0111772 A1* | 8/2002 | Skidmore | H04L 41/12 | 702/186 |
| 2003/0050878 A1* | 3/2003 | Rappaport | G06Q 30/04 | 705/34 |
| 2004/0229623 A1* | 11/2004 | Rappaport | G01F 23/0061 | 455/446 |
| 2004/0236547 A1* | 11/2004 | Rappaport | G06F 17/509 | 703/2 |
| 2005/0186915 A1* | 8/2005 | Williams | G06Q 50/265 | 455/67.11 |
| 2007/0066233 A1* | 3/2007 | Smith | H01Q 1/1257 | 455/67.11 |
| 2007/0174467 A1* | 7/2007 | Ballou, Jr. | H04L 63/0838 | 709/227 |
| 2009/0015409 A1* | 1/2009 | Cheung | G06K 7/10336 | 340/572.1 |
| 2010/0190509 A1* | 7/2010 | Davis | H04W 56/006 | 455/456.1 |
| 2012/0101797 A1* | 4/2012 | Rappaport | H04W 16/20 | 703/13 |
| 2013/0217418 A1* | 8/2013 | Maurin | H04W 4/02 | 455/456.3 |
| 2014/0051451 A1* | 2/2014 | Goldberg | H04W 16/18 | 455/446 |
| 2015/0134235 A1* | 5/2015 | Shan | G01C 21/26 | 701/409 |
| 2016/0037356 A1* | 2/2016 | Bathula | H04W 16/18 | 455/446 |
| 2017/0331670 A1* | 11/2017 | Parkvall | H04J 11/0079 | |
| 2018/0113593 A1* | 4/2018 | Ng | G06F 3/04815 | |

* cited by examiner

RADIO SIGNAL PATH DESIGN TOOL WITH GRAPHICAL DISPLAY TO FACILITATE SELECTION OF ALTERNATIVE RADIO ANTENNA SITES

RELATED APPLICATIONS

This application is a continuation of U.S. patent application Ser. No. 15/947,643, entitled "Radio Signal Path Design Tool With Graphical Display to Facilitate Selection of Alternative Radio Antenna Sites," filed on Apr. 6, 2018, which claims priority to and benefit from U.S. Provisional Patent Application No. 62/483,202, entitled "Radio Signal Path Design Tool With Graphical Display to Facilitate Selection of Alternative Radio Antenna Sites," filed on Apr. 7, 2017, all of which are hereby incorporated by reference in their entireties.

BACKGROUND

In order to ensure reliable radio communication between terrestrial locations, it is important to have a reliable method of estimating the extent to which radio signals attenuate as the signals propagate between the locations, i.e., to estimate the path loss or determine a clear line of sight (LOS) path between the locations. Radio signal propagation in free space is affected by a variety of phenomena including diffraction, refraction, reflection, absorption by the atmosphere, and obstruction by material and by the earth's horizon. The radio link budget which takes into account all the gains and losses from the transmitter, through the transmission medium, to the receiver depends on a variety of factors including antenna properties (gain, directivity, front-to-back ratio, etc.), frequency or wavelength of the radio signal, interferers, natural and man-made obstructions, environmental factors such as altitude and weather, link distance, and antenna height, among other factors. Generally, the more the path between the transmitter and the receiver antennas is clear from obstructions, the less the signal losses. One way to ensure that the path is free of obstructions is to raise the height of the transmit and/or receive antennas above any obstructions that might exist along the path thereby ensuring sufficient clearance within the first Fresnel zone. To assist in designing such radio links, wireless engineers typically utilize a radio path design tool in the design process that utilizes clutter and terrain data to allow the wireless engineer to model the path loss or line of sight (LOS) between two proposed locations for radio antenna towers. However, the data model of the potential obstructions between the proposed locations is typically not precise for several reasons including the inherent finite resolution of the data model, new man-made constructions, or growth in foliage since the clutter data was collected. Furthermore, even with perfectly accurate clutter and terrain data, the precise locations proposed to erect antenna towers may turn out to be unavailable due to previously unforeseen factors such as existing un-modeled infrastructure at the site, local ordinances, construction hazards, etc. Additionally, even where the sites are available, the deployment team might prefer to relocate the antennas to minimize radio interference from newly discovered co-channel or adjacent channel radiators at the site, to collocate the antenna with others, or for any other reason. It is therefore essential to have a path design tool that readily allows for the quick selection of optimal alternative antenna placement sites around the originally proposed sites.

One of the limitations in existing radio path design tools is that the tool computations are based on pre-determined latitude and longitude coordinates for transmitting and receiving antenna towers. These tools provide little flexibility in antenna tower placement from the beginning of the design phase. The users of such path design tools have no visual display of, or ability to rapidly simulate, different antenna placements that would still meet the link budget. FIG. 1, for example, depicts an example plot 100 of currently-available design tool. The plot 100 illustrates the placement of a first antenna tower 155 at one end of a link and a second antenna tower 160 at the other end of the link. In between the towers, the plot 100 depicts intervening terrain 165, clutter 167, and the path link 170. By only considering the terrain and clutter data between the first tower 155 and second tower 160, the prior art design tool fails to provide much flexibility for wireless engineers designing radio links. For example, if the proposed site for locating the first tower 155 and/or the second tower 160 proves infeasible during site construction, wireless engineers would have to repeat the path link design in order to determine alternative antenna sites around the proposed sites that still meet the target link budget. It is therefore advantageous to have a path design tool that would provide greater flexibility to wireless engineers during the design process.

DETAILED DESCRIPTION

A radio signal path design tool that provides for a visual depiction of the viability of alternative antenna locations around proposed fixed antenna sites is disclosed herein. The disclosed design tool computes a radio link path loss, a line of sight (LOS) profile, or a model reflecting other path design goals, at the proposed antenna sites while simultaneously displaying alternative locations around the fixed antenna sites that would potentially achieve the radio link design goals. By providing a robust visualization, the design tool allows for a ready assessment of alternative radio link paths adjacent to the proposed link path, which allows for flexibility in deploying radio antennas.

In some embodiments, the alternative antenna locations are represented as an array of points, arranged in a grid pattern, surrounding the proposed antenna sites. The path design tool may change each displayed point so that the point visually reflects the extent to which the corresponding location satisfies the radio link design goals. For example, points representing locations satisfying the radio link design goals may be depicted in one color, points representing locations which do not satisfy the radio link design goals may be depicted in another color, and points representing locations partially satisfying the design goals may be depicted in yet another color. As another example, the size of the point may correspond to the extent that the corresponding location satisfies the radio link design goals. By providing a grid display around the proposed fixed antenna site, the path design tool allows a wireless designer to quickly assess a multitude of other alternative site locations.

Various embodiments of the disclosed radio link path design tool will now be described. The following description provides specific details for a thorough understanding and an enabling description of these embodiments. One skilled in the art will understand, however, that the tool may be practiced without many of these details. Additionally, some well-known structures or features may not be shown or described in detail so as to avoid unnecessarily obscuring the relevant description of the various embodiments. The terminology used in the description represented below is intended to be interpreted in its broadest reasonable manner, even though it is being used in conjunction with a detailed description of certain specific embodiments of the tool.

Figure 1:
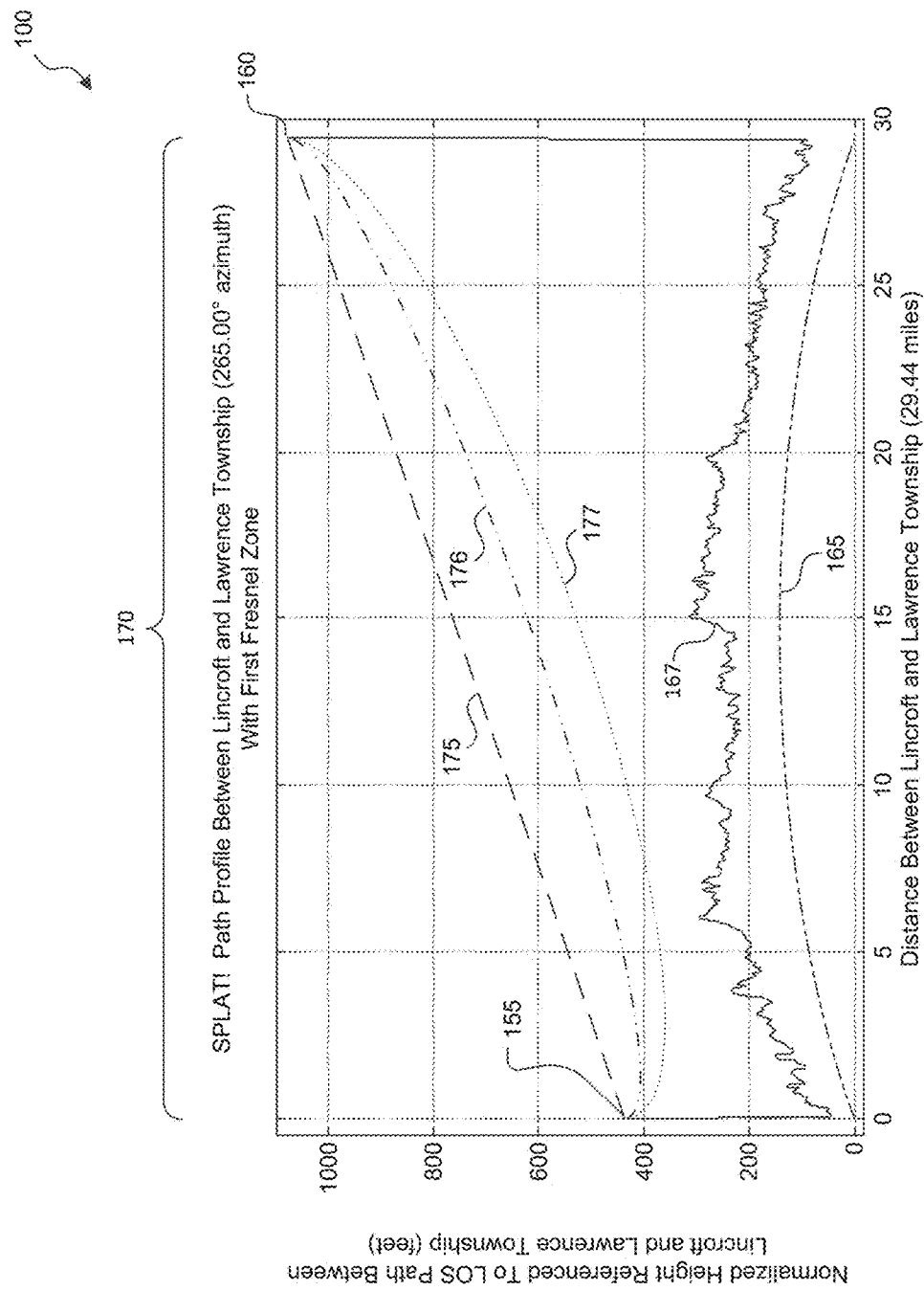
FIG. 1 is a representative plot of a prior art radio signal path design tool.
Figure 2:
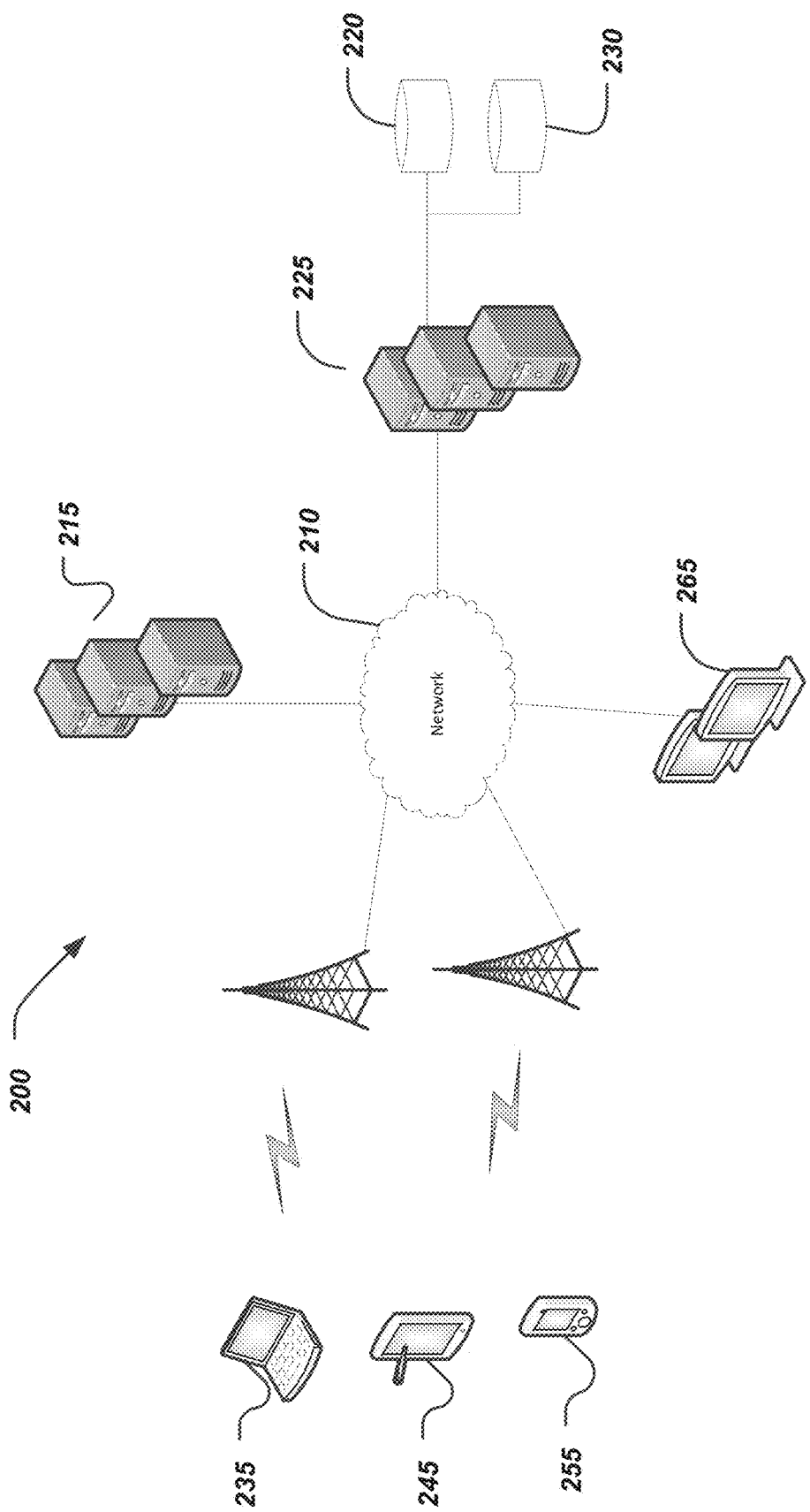
FIG. 2 is a representative environment in which the radio signal path design tool may operate.

FIG. 2 and the following discussion provide a brief, general description of a suitable environment in which a radio signal path design tool may operate. Although not required, aspects of the tool can be embodied in computer-executable instructions, such as routines executed by a general-purpose computer, a personal computer, a server, or other computing system. The tool can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), field programmable gate arrays (FPGAs) or the like, or a combination of such devices. Computer-executable instructions may be stored in memory, such as random access memory (RAM), read-only memory (ROM), flash memory, or the like, or any combination of such components. Computer-executable instructions may also be stored in one or more storage devices, such as magnetic or optical-based disks, flash memory devices, or any other type of non-volatile storage medium or non-transitory medium for data. A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network. The processes, modules and logic flows described in this specification can be performed by one or more programmable processors executing one or more computer programs to perform functions by operating on input data and generating output. Aspects of the radio signal path profiling tool can therefore be practiced in distributed computing environments, where tasks or modules are performed by remote processing devices, which are linked through a communication network, such as a Local Area Network ("LAN"), Wide Area Network ("WAN"), or the Internet.

Referring to the example of FIG. 2, a representative environment 200 in which aspects of the described technology may operate include one or more client computing devices 235, 245, 255, and 265 capable of running a web browser of other desktop of server application, and servers 215 and 225, capable of interacting with a web server and remotely communicating with the client computing devices. The client computing devices communicate with the servers through network 210 including, for example, the Internet.

Aspects of the radio signal design tool may be practiced by the client computing devices 235, 245, 255, and 265 and server devices 215 and 225. For example, client computing devices could run a web browser to login to a web application on a web server hosted on the server devices 215 and 225, receive user input via the web browser to configure the radio link design input parameters as needed, and trigger execution of radio signal path parameter computation on the web application or at the web server. The web application implementing the radio signal design tool, or the web server serving the web application, may obtain additional input data from third party storage devices or servers 220 and 230. These storage devices may also be connected to the web server or client devices through the network 210 or may be warehoused locally on the server computers 215 and 225, or on the client devices 235, 245, 255, and 265. Such input data could include, for example, National Land Cover Database (NLCD) data offered by the Multi-Resolution Land Characteristics (MRLC) Consortium, Light Detection and Ranging (LIDAR) data offered by various commercial and non-commercial sources, and Federal Communication Commission (FCC) Microwave Source data.

Figure 3:
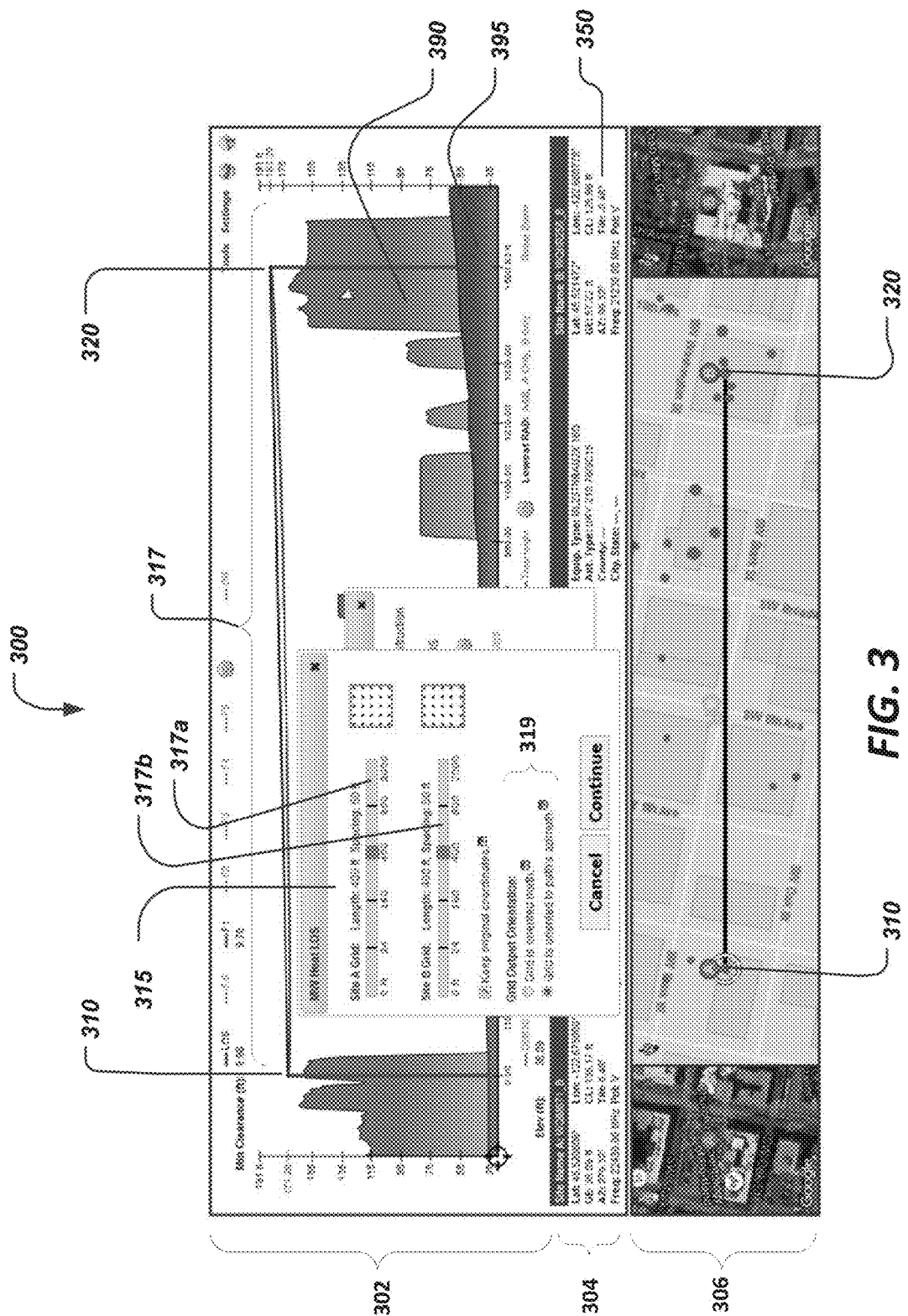
FIG. 3 is a representative user interface of a radio signal path design tool that uses an array of points in a heat map to represent viable alternative paths around proposed antenna locations.

FIG. 3 is a representative user interface 300 generated by the radio signal path design tool. As discussed above in the description of FIG. 2, the path design tool may be realized as a web application via a web browser in client devices such as desktops, laptops, tablets, or other mobile devices. It may also be implemented as an executable application on a machine running Windows, Macintosh, Linux, or other operating system.

The path design tool interface 300 is divided into three sections 302, 304, and 306. The first section 302 depicts a graphical representation of a horizontal cross-section of the air interface between and around two proposed radio towers.

The second section 304 includes a number of parameters characterizing the proposed placement of the two radio towers and the communication link between the towers. As will be described in additional detail herein, such parameters may include latitude and longitude coordinates of each tower, characteristics of antennas utilized on each tower, frequency of link, and other physical or non-physical characteristics of the tower, antenna, link, or surrounding infrastructure. The third section 306 depicts a graphical representation of an aerial view of the two radio towers as placed on a street or satellite view map. As will be described in further detail herein, the path design tool can display an array of points, arranged in a grid pattern, around the two radio tower locations depicted in the third section 306. The grid display is used by wireless engineers to assess alternative antenna placement locations for the radio towers. It will be appreciated that the use of three sections is only exemplary, and other interfaces having windowing, pop-ups, or other GUI elements could be used to represent the same or different data depicted in the three sections.

In order to design a radio link with the radio signal path design tool, a user enters various link parameters 350 that are depicted in the second section 304. The entered parameters include the latitudes and longitudes of a first antenna site 310 (referred to herein as "site A") and a second antenna site 320 (referred to herein as "site B"). The latitude and longitude of site A are represented by the coordinates ($\phi_A$, $L_A$) and latitude and longitude of site B are represented by the coordinates ($\phi_B$, $L_B$). The user also enters other parameters needed by the radio signal path design tool such as the antenna azimuth, down tilt, frequency, polarization, part number, among other parameters such as name of the geographic location of the sites, and type of radio equipment at the sites. Additional parameters that are depicted in the second section 304 may be computed or derived by the tool using the entered parameters. When the design tool is used by a wireless engineer, one or both of the antenna locations are proposed locations, meaning that the tool is being used to help select an appropriate antenna site for one or both locations, or given the antenna sites, to determine the path loss or LOS or other radio propagation parameters resulting from the selection.

Using the entered link parameters 350, the radio signal path design tool generates a radio profile of the link depicted in the first section 302 as well as an aerial map view of the link depicted in the third section 306. To generate the display in the first section 302, the radio signal path design tool imports terrain data 395 and/or clutter data 390 to provide a visual display of the radio link at site A 310 and at site B 320. Terrain data includes land features such as mountains, hills, plateaus, rivers, bodies of water, etc. Clutter data includes any man-made or natural features extending above the terrain, such as trees, buildings, houses, antennas, utility poles, light poles, etc. The design tool may obtain the terrain data 395 or clutter data 390 or other appropriate land use/land cover data from, for example, USGS DEM30, SRTM 30, or ASTER datasets, or from custom user-entered obstructions or variations of LiDAR datasets, among others. To generate the interface in the third section 306, the radio signal path design tool imports map data from, for example, Google™ maps, Bing™ maps, or other mapping service having an API. The map data allows the design tool to provide a visual display of the radio link between sites A and B by providing an aerial street or satellite view map.

To facilitate the analysis of the antenna site locations, the path design tool generates a grid overlay on the tower locations in section 306. Before displaying the grid, a user of the tool can specify the size and orientation of the grid that is to be displayed. To specify the size and orientation, the design tool generates a configuration interface 315 that is displayed to the user. The configuration interface includes a slider 317a that allows the user to specify the size of the grid surrounding site A and a slider 317b that allows the user to specify the size of the grid surrounding site B. In the depicted embodiment, the user is allowed to specify a grid size ranging from 0 feet (i.e., no grid) to 2000 feet on an edge. To select the desired size, the user moves the slider bar to the appropriate setting. It will be appreciated that the selected grid sizes may be different for each site. In other words, the user may, for example, set a grid size of 300 feet for site A and a grid size of 160 feet for site B. Different sizes may be desired depending on, for example, the building and terrain conditions of the specified site locations. The selected grid will be centered on the corresponding site, meaning that a site grid of 2000 feet will extend 1000 feet in opposite directions from the site location. It will also be appreciated that methods other than a slider may be implemented to allow the user to enter the desired grid size including text boxes, radio buttons, drop down menus, an interface to allow a user to trace boundary on a map overlay, etc.

In some embodiments, the spacing of the points within the grid are determined from the selected grid size and number of points desired within the grid. For example, if the grid generated by the design tool is a 9×9 grid (that is, there are 81 points within the grid), then selection of a grid size of 400 feet (covering 160,000 square feet of area) results in a spacing between each point of around 50 feet, given a point in each corner of a square grid. Conversely, if the grid size is 160 feet, then the spacing between each point would be approximately 20 feet. The spacing of the grid points is automatically computed by the design tool and displayed to the user. In some embodiments, however, the configuration interface 315 may provide a control (not shown) to allow the user to specify the number of points in a grid, or the desired spacing between each point in a grid. The number of points within the grid is directly related to the number of simultaneous path profile computations the design tool needs to make so selecting a very large number could slow down the design tool. The spacing between points would typically be selected depending on the resolution required by the user of the design tool.

Although the depicted grid in the configuration interface 315 is square, it will be appreciated that other grid geometries may be utilized by the design tool. For example, configuration interface 315 may allow a user to select from various grid geometries such as circular grids, rectangular grids, hexagonal grids, or other shapes. After geometry selection, the design tool may allow the user to input pertinent dimensions related to the selected grid, for example, a radius for a circular grid, a length and width dimension for a rectangular grid, etc.

In some embodiments, the size or geometry of the grid around either site may be based on the size or geometry of a structure at either site or the real-estate available to deploy antennas at either site. For example, the size and geometry of the grid could overlay the roof-top area or the property boundary available to erect an antenna structure. In other embodiments, the size or geometry of the grids may be based on terrain or clutter data. For example, the size of the grids, the geometry of the grids, or the spatial distribution of points within the grid may be adjusted based on the clutter data so as to avoid bodies of water or other regions where it would be impractical or uneconomical to place an antenna.

In some embodiments, the design tool may allow a user to specify how the points are distributed within the grid. For example, a user may specify that they would like each point to be uniformly distributed within the grid. Alternatively a user may specify that they would like the grid points to be concentrated around the proposed radio towers with the distribution of points becoming more sparse further away from the proposed radio towers. The user or the administrator of the design tool may also specify any other spatial distribution function desired to distribute the points within the grid.

The configuration interface also includes radio buttons 319 that allow the user to specify the orientation of the displayed grid around site A and site B. For example, by selecting one radio button, the grids will be oriented with their axis along a north/south direction. By selecting the other radio button, the grids' axis will be oriented along the azimuth of the path between the radio antenna at site A and the antenna at site B. It will be appreciated that other controls (not shown) may be provided to a user to allow the user to specify that the grids' axis be oriented in any fixed direction (i.e., other than north and independent of the azimuth of the path between the radio antennas). While it is envisioned that the grids are similarly oriented, the grids may have different orientations. For example, site A's grid may be oriented north while site B's grid may be oriented to the azimuth of the path between site A and site B.

In some embodiments, the configuration interface 315 allows the user to select a coordinate system (not shown) in which to place the grids. For example, the configuration interface 315 may provide a selection allowing a user to keep the original coordinates that were used to compute the path loss, LOS profile, or other path design metric between site A 310 and site B 320. In such a case, after the user drags and drops (as will be further described herein) the antenna selection marker to a different point within the grid around site A 310, for example, the path design tool would not recalculate the path design metrics based on the new antenna placement, i.e., based on a new grid around the new antenna placement site. On the other hand, if a user selects in the configuration interface 315 not to keep the original coordinates, the path design tool would recalculate the path design metrics based on the new antenna placement location based on a new grid around the new antenna placement site. Keeping the original coordinates is useful if, for example, the original grids represent the universe of allowed antenna placement locations.

Figure 4:
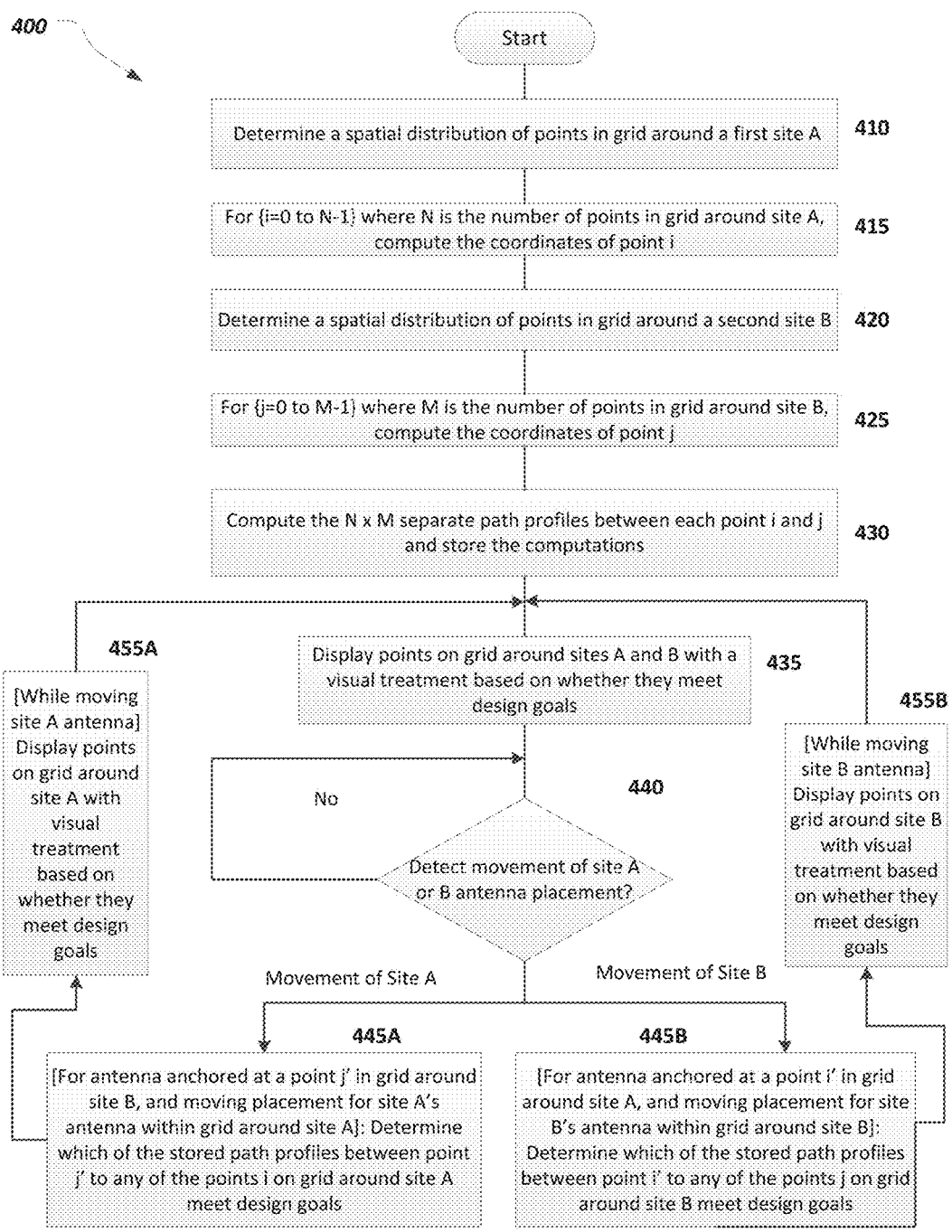
FIG. 4 is a representative flow chart of a process implemented by the radio signal path design tool to compute path design metrics between each of the array of points on opposite ends of a radio link.

FIG. 4 is a flow chart of a process 400 implemented by the radio signal path design tool to compute the path loss or LOS profile for each grid point. At block 410 the design tool determines the spatial distribution of points around the first site A 310 based on the desired grid characteristics entered by the user in the configuration interface 315. At block 415, using the desired spatial distribution of points determined in block 410, the design tool determines the coordinates of each point "i" around site A 310 for each of the N points specified in or derived from the settings entered in the configuration interface 315. At block 420, the design tool determines the spatial distribution of points around the second site B 320 based on the desired grid characteristics entered by the user in the configuration interface 315. At block 425, the design tool determines the coordinates of each point "j" around site B 320 for each of the M points specified in or derived from the settings entered in the configuration interface 315. The determined coordinates of each grid point are typically specified by latitude-longitude pairs.

At block 430, the design tool computes separate path loss, LOS profiles, or other desired radio link design metric between each point i and each point j and stores the result of the computations. That is, the design tool computes N×M path profiles between all grid points. For example, if N=81, meaning that there are 81 separate grid points selected around site A 310, and M=81, meaning that there are also 81 separate grid points selected around site B 320, the design tool will compute 6,561 separate path design metrics between each of the N points around site A and each of the M points around site B. The N×M computations are irrespective of size of the grid or the spatial distribution of the points within the grid. The path design metric for the current proposed antenna placement at site A 310 and site B 320 is typically computed along with the computation of the N×M computations. By pre-computing the path profiles between all grid points, the design tool is able to generate a user interface that can be quickly modified as a tool user modifies antenna placements.

At block 435, the design tool provides a visual indication of which of the points in the grids around each proposed antenna site meet a desired path design goal. That is, each of the points in the grid surrounding site A are displayed using a visual treatment that indicates whether those points satisfy a path design goal such as path loss or LOS if paired with each of the points in the grid surrounding site B. Similarly, each of the points in the grid surrounding site B are displayed using a visual treatment that indicates whether those points satisfy a path design goal if paired with each of the points in the grid surrounding site A. The grid points that meet the design goal are visually displayed in section 306 of the path design tool interface 300 using one visual indicator such as the color green; the grid points that do not meet the design goal are displayed in a different visual indicator such as the color red; and, the grid points that partially meet the design goals are displayed in yet a different visual indicator such as the color amber. It will be appreciated that different visual indicators such as color coding, size of grid element, type of grid element (e.g., stars, circles), etc. may be utilized to indicate the extent to which each point meets a specified design goal. By identifying those grid points that reflect antenna placements that, should an antenna be moved to that location, still meet a desired design goal, the design tool allows wireless engineers to quickly assess other viable antenna location placements. For example, if all the points in each of the grids are visually rendered to indicate that they meet design goals (e.g., all points are green), the wireless engineers may notify the field installation team that they are free to erect antennas at any location within those grids. In contrast, if the majority of the points in the grid indicate that the corresponding locations fail to meet design goals (e.g., most points are red), the field installation team may realize that potential placements at the selected site are severely constrained.

At block 440, the design tool detects whether the user wishes to relocate an antenna to an alternative antenna site at either site A 310 or site B 320. The user may do so by selecting the current site A or site B antenna location, and using drag and drop functionality, move the antenna location to an alternative site within the corresponding displayed grid. For example, to explore viable antenna sites around site A, a user would vary the placement of antenna at site A 310 within section 306 of the path design tool interface 300. If the movement of one of the antenna sites is detected at decision block 440, processing continues to a block 445A or 445B depending on which site's antenna is being moved. Otherwise, the design tool waits to detect the movement of any antenna site. It will be appreciated that other methods of selecting the antenna placement location other than by a drag-and-drop functionality may be implemented such as by selecting or entering a grid point to snap to that point, or by entering coordinates that the user wishes to relocate an antenna to. In some embodiments, the path design tool may also be automatically programmed to select the next best grid point to traverse based on how well the location represented by that grid point meets a path design metric.

If at decision block 440, the design tool detects a movement of site A's antenna placement, it determines at block 445A which of the design metrics stored at block 430 between the points in the grid around site A and the point corresponding to the non-moved (fixed) antenna site B meets design goals (or to what extent they fail to meet the design goals if they do not). At block 455A, the path design tool visually renders the grid around site A to depict the determination at block 445A by visually modifying the points in the grid around site A that meet design goals relative to the fixed (anchored) point representing the antenna location at site B. Points meeting the design goal are displayed with one visual rendering (e.g., green), points that do not meet design goals with another visual rendering (e.g., red), and points that partially meet the design goals with yet another visual rendering (e.g., amber).

Figure 6A:
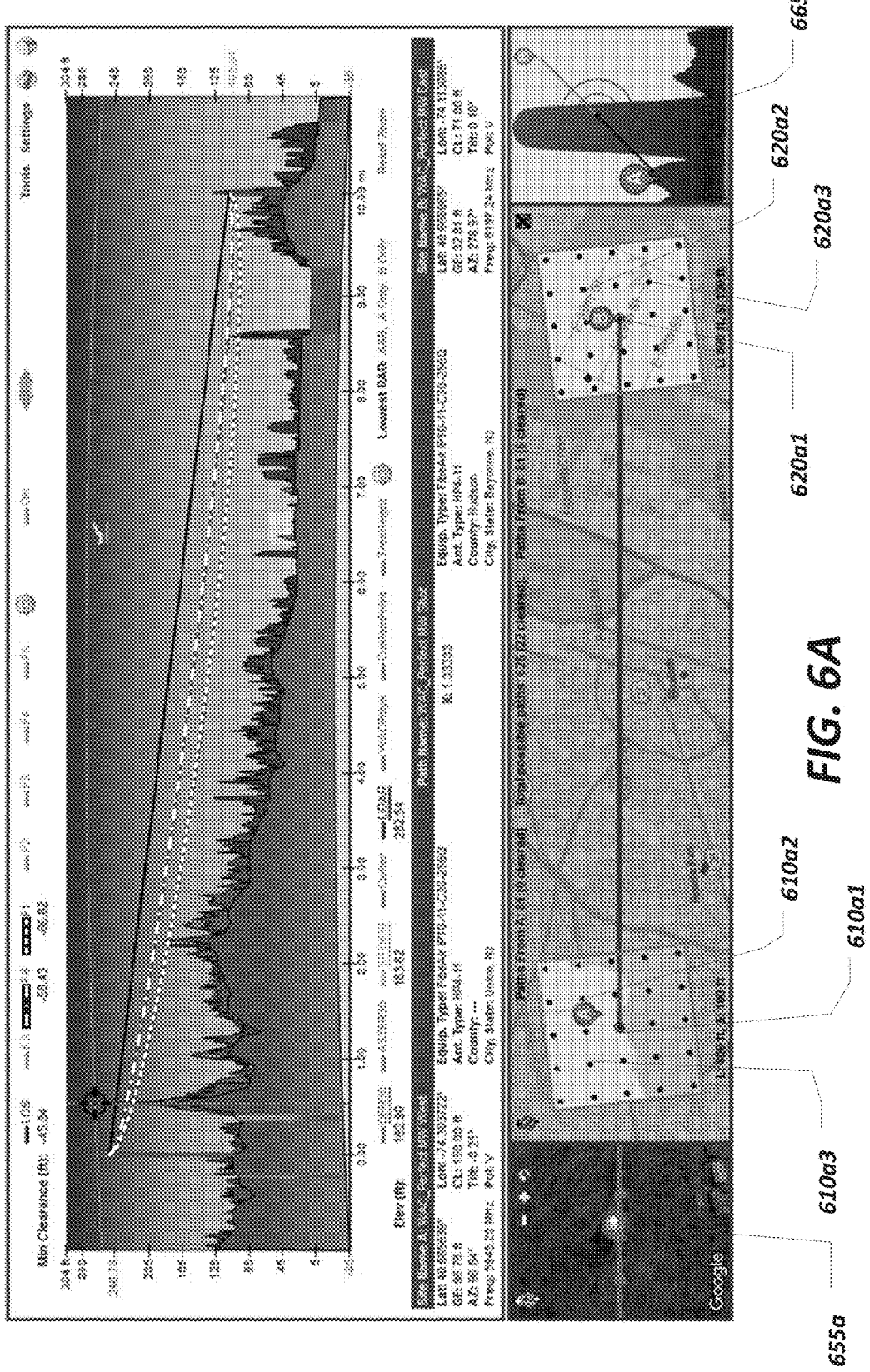
FIGS. 6A-6D depict changes to the heat map display as antenna placement locations on either side of the link are moved onto potential alternative antenna placement locations.
Figure 6B:
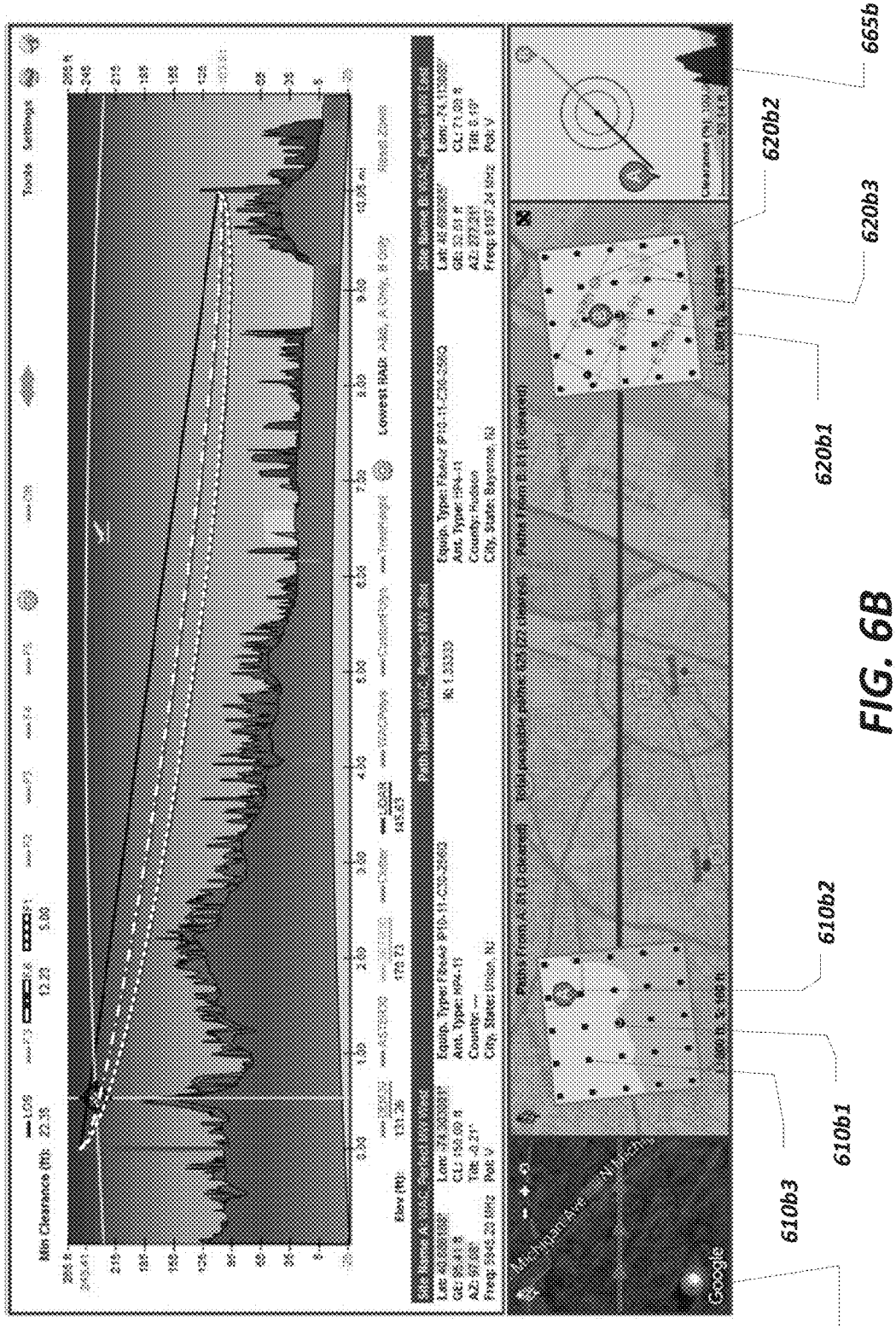

For example, turning to FIG. 6A, as the placement of the antenna at site A is changed, the antenna at site B remains anchored (fixed) at a point 620a1 in the grid around site B. Dragging the antenna placement indicator from the original grid point 610a1 around site A causes the design tool to display the grid point 610a2 to denote that the path between the point 610a2 and the point 620a1 meets the path design goals (for example, would result in a LOS link between points 610a2 and 620a1 if the site A antenna were moved to the point 610a2). Conversely, the design tool displays the grid point 610a3 to denote that the path between the points 610a3 and 620a1 would not meet the design goals if site A's antenna were placed at the point 610a3. FIG. 6B illustrates user placement of the antenna at the point 610b2 (corresponding to the point 610a2 in FIG. 6A). Once the antenna is placed at the point 610b2, the path design tool displays at block 435 (in FIG. 4) the points in the grids around site A and B based on whether and to what extent they meet the design goals as discussed previously.

FIGS. 6A and 6B illustrate how the path design tool can be used to avoid an obstruction between the radio link path, such as the water tank seen in sections 655a and 665a in FIG. 6A, by relocating the antenna at site A from point 610a1 to point 610a2 (see sections 655b and 665b in FIG. 6B depicting the radio link path unobstructed by the water tank).

Returning to FIG. 4, if instead at decision block 440 the design tool detects movement of site B's antenna placement, it determines at block 445B which of the design metrics stored at block 430 between the points around site B and the non-moved antenna at site A meets the design goals. At block 455B, the design tool displays the points in the grid around site B based on whether, and to what extent, those points meet the design goals relative to the fixed (anchored) point representing the antenna location at site A.

Figure 6C:
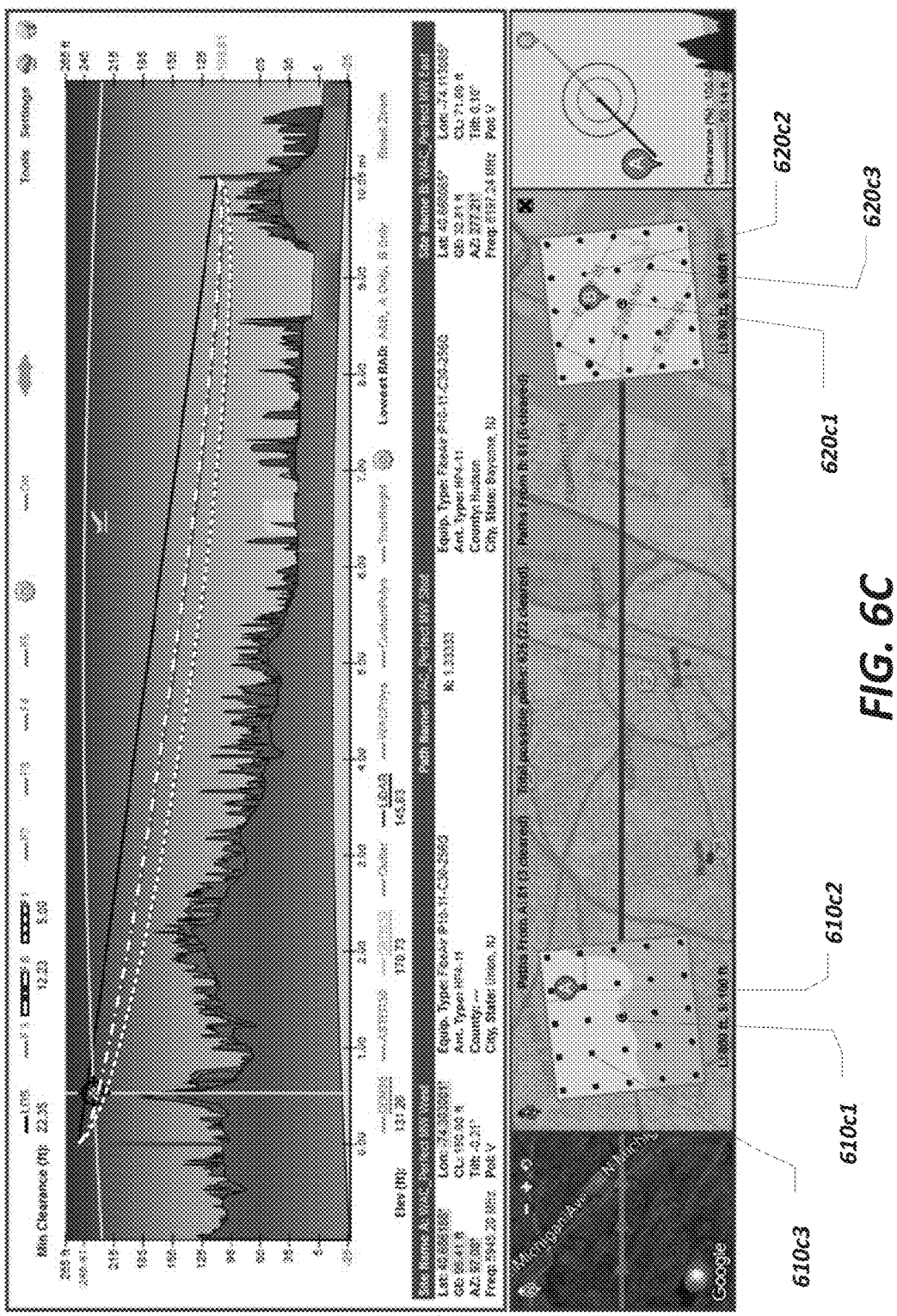
Figure 6D:
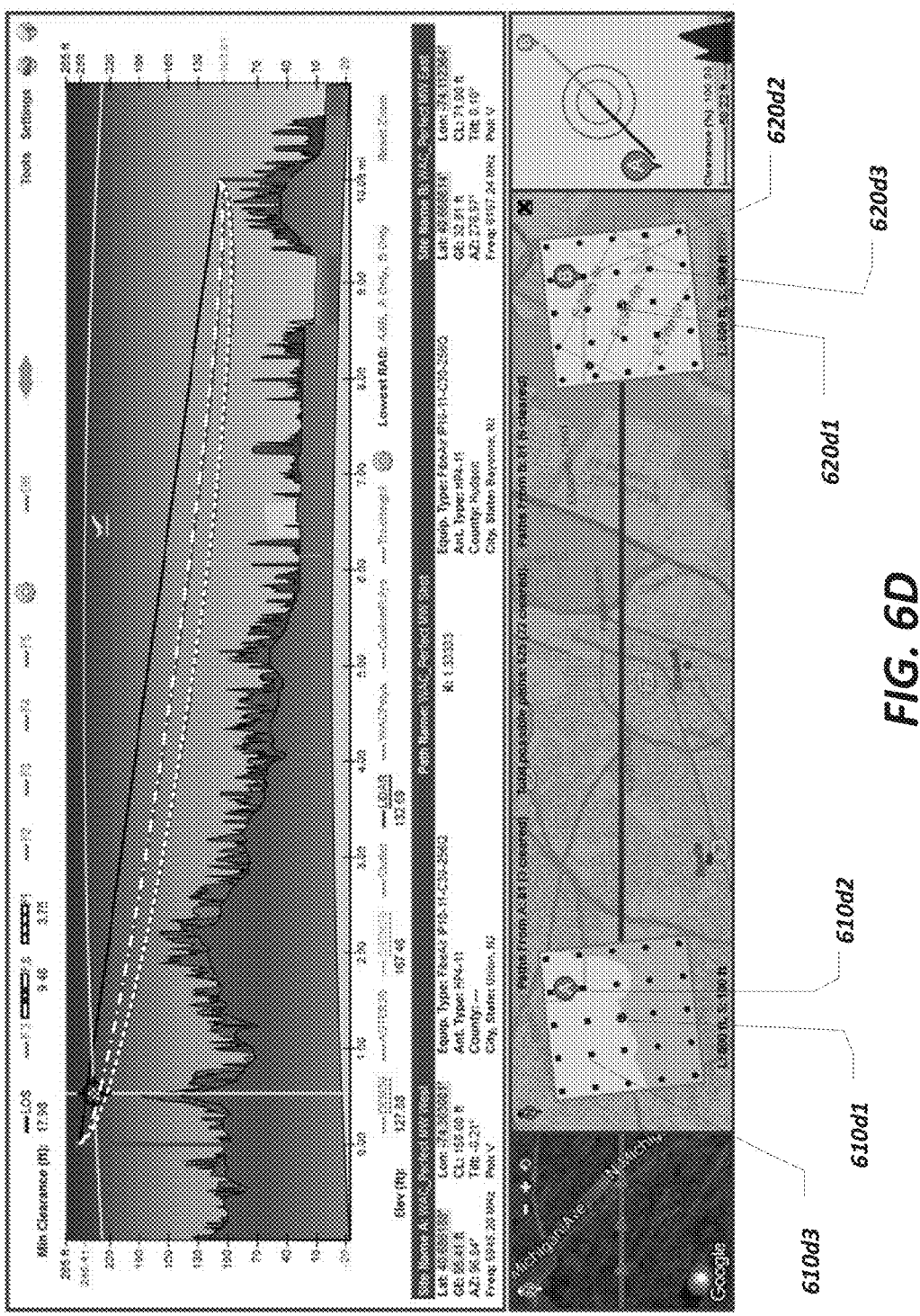

This is illustrated in FIGS. 6C and 6D. In FIG. 6C, dragging the antenna placement indicator from the original grid point 620c1 in Site B causes the design tool to display the grid point 620c2 to denote that the path between the point 620c2 and the fixed (anchored) point 610c2 in site A meets the path design goals (for example, would result in a LOS link between points 620c2 and 610c2 if the site B antenna were moved to the point 620c2). Conversely, the design tool displays the grid point 620c3 to denote that the path between the points 620c3 and 610c2 would not meet the design goals if site B's antenna were placed at the point 620c3. FIG. 6D illustrates user placement of the antenna at the point 620d2 (corresponding to the point 620c2 in FIG. 6C). Once the antenna is placed at the point 620d2, the path design tool displays at block 435 (in FIG. 4) the points in the grids around site A and B based on whether and to what extent they meet the design goals as discussed previously.

Figure 5:
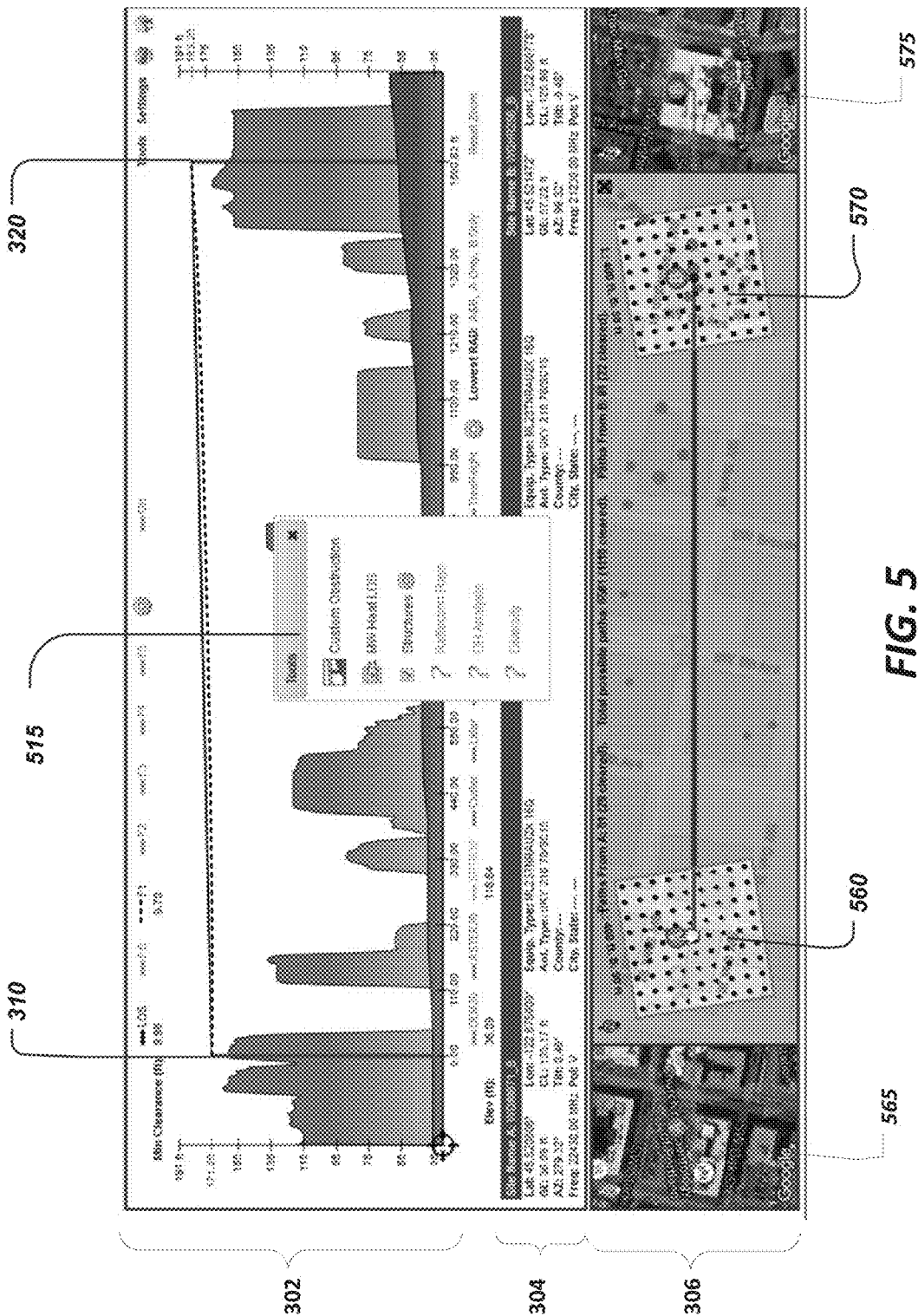
FIG. 5 is a representative user interface of a radio signal path design tool showing a heat map display of an array of points around proposed antenna sites, the array of points indicating locations having clear line-of-sight paths and locations having obstructed paths.

In some embodiments, the visual depiction at blocks 435, 455A, and 455B is based on how far off a path is to meeting the path criteria specified in the design tool (the specification of the path criteria will be further described in relation to FIG. 5). For example, if the path criteria is defined with reference to the first Fresnel zone, different color codes or visual depictions may be used by the design tool to represent the percentage clearance of the first Fresnel zone. A point in the grid around site A providing a 100% clearance of the first Fresnel zone could be depicted with a green dot; a point providing a 50% clearance could be depicted with a yellow dot; a point providing a 0% clearance, i.e., completely obstructed, could be depicted with a red dot. Other color combinations could be assigned to percentage clearances between 0 and 100%. Although the discussions in this disclosure are based on path clearance, a person having ordinary skill in the art will appreciate that the same methodology for visually displaying the points around the fixed antenna sites could be based on any other computed radio path design parameter such as the path loss, link availability, fade margins, bit error rates, minimum antenna heights, signal-to-interference-plus-noise ratio (SINR), etc.

In some embodiments, the design tool may interpolate the computed radio path profile between the points in order to render a continuous gradient of "good" and "bad" zones for the visual depiction at blocks 435, 455A, and 455B. These embodiments provide visual depictions akin to heat maps where the intensity of the color indicates how good or bad the specific location is (i.e., how good the radio signal would be if that point was used or how bad the radio signal would be). For example, regions within the grids that would result in the strongest signal could be shaded dark green, regions that would result in the worst signal dark red, regions that would result in signal levels in between these extremes would have different gradations of green or red relative to how good or bad the path loss or LOS would be. These visual depictions provide a way for the user of the design tool to quickly determine viable alternative locations for one of both antennas particularly when overlaid with custom clutter data from a site analysis depicting what points would be available to mount antennas and which would not.

FIG. 5 depicts the representative user interface 300 of the radio signal path design tool as updated by the process 400 with a generated grid of points 560 and 570. The user interface 300 provides for a tool interface 515 that allows the user of the design tool to define and/or visualize various objects in the horizontal path profile depicted in section 302 or in the aerial profile depicted in section 306. For example, the tool interface 515 may allow the user to define a custom obstruction absent from the imported clutter or terrain data. Alternatively, the tool interface 515 may allow for the user of the design tool to display or hide the structures imported from the clutter data.

Of particular benefit to users of the radio signal path design tool is the ability for a user to utilize the grids 560 and 570 to assess alternate tower locations. As was described with respect to FIG. 4, the representation of each point within the grids 560 and 570 is based on the computed path loss or LOS profile (or other path design metrics) between the points in grid 560 and the points in grid 570. For example, if the tool interface 515 is configured to display line-of-sight (LOS) paths, each of the points within grid 560 around site A that would result in a LOS path with the points within grid 570 around site B would be displayed in a certain manner. In contrast, those points that would not result in a LOS path would be displayed differently. In some embodiments, whether the individual points in the grids 560 and 570 meet the design objective are differentiated by color-coding. For example, points within the grids meeting the design objectives such as having a clear LOS may be depicted as green dots, with certain alphanumeric characters such as "Y" for "Yes", with certain symbols, or with any other pre-defined visual indicator. Similarly, points within the grids failing to meet the design objectives such as having an obstructed LOS may be depicted as red dots, with certain alphanumeric characters such as "N" for "No", with certain symbols, or with other pre-defined visual indicators. Additionally, the aerial or satellite photos 565 and 575 enable the user to visualize that structures within grids 560 and 570 (respectively) that may be obstructing a LOS path. By overlaying the grid with site images, tool users are able to more quickly assess design tradeoffs of different antenna locations.

Figure 7:
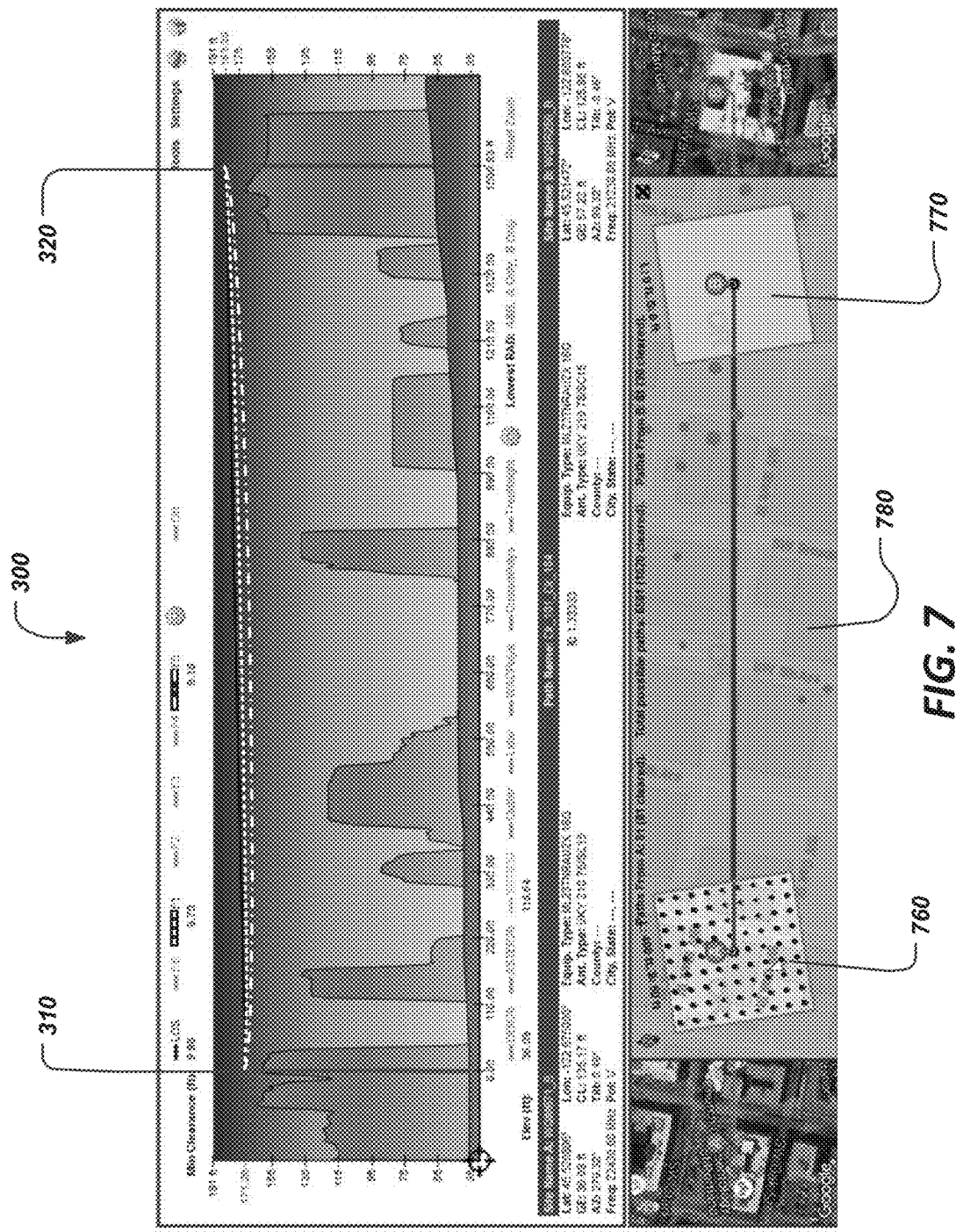
FIG. 7 is a representative user interface of a radio signal path design tool showing a heat map display of an array of points around proposed antenna sites, the array of points indicating locations having clear line-of-sight paths and locations having obstructed paths where one site is on a fixed immovable position.

FIG. 7 shows the representative user interface 300 of the radio signal path design tool showing an aerial view 780 and a display of an array of points 760 around proposed antenna site 310. In this exemplary embodiment, proposed antenna site 620 is on a fixed immovable location. For example, the antenna site 720 may be an existing antenna tower where the wireless engineer needs to collocate one of the link antennas on, or a precisely allocated roof-top space where the wireless engineer must erect a tower antenna. In this case, the region 770 around antenna site 320 would not include an array of points where the antenna may be relocated to because it is immovable. Furthermore, in such scenarios, the spatial distribution of points around the fixed antenna site 320 need not be input into the configuration interface 315. However, even where such spatial distribution of points are input into the configuration interface 315, the design tool need not compute the alternative path profiles to these points surrounding the fixed antenna once the site is defined in the configuration interface 315 as a fixed immovable site. Other embodiments may provide other variations between fixed and movable antenna sites. For example, some embodiments may provide for discrete points within the region 770 where antenna site 320 may be relocated to, these discrete points being less than total array of points that could be defined in the configuration interface 315. For example, the wireless engineer might have access to only 3 alternative antenna towers on which to mount the antenna for site 320. In this case the path design tool would only compute the path profile between each of the points in grid 760 to each of these 3 antenna tower locations within region 770. The ability of design tool to constrain the discrete spatial locations of either antenna tower is useful to reduce the amount of path profile computations that design tool needs to make. This allows for faster operation of design tool or for the selection and processing of more points within the selected grids.

Figure 8:
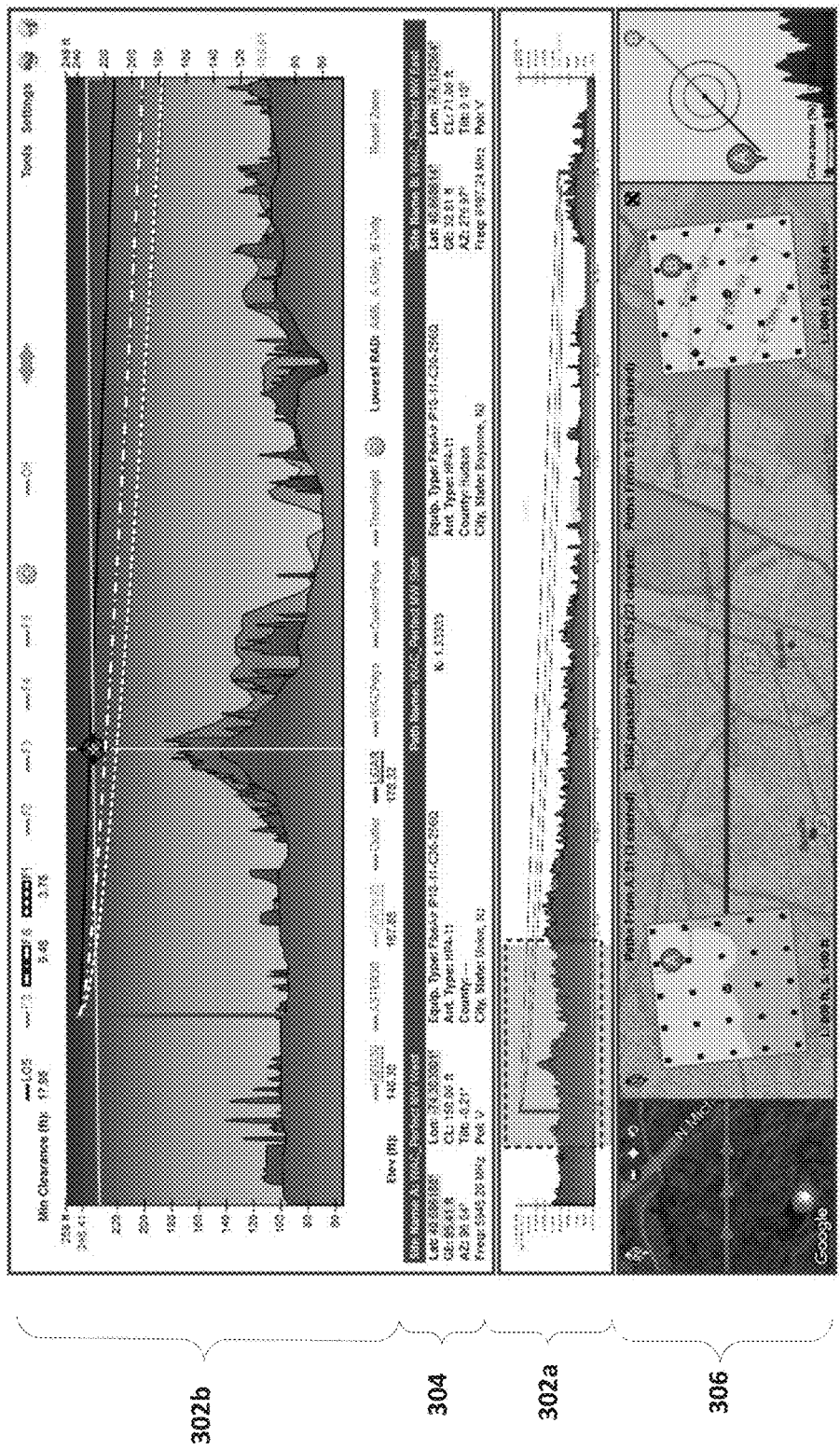
FIG. 8 is a representative user interface of a radio signal path design tool showing zooming on segments of the radio link.

FIG. 8 shows a representative embodiment of the path design tool showing at section 302*b* the ability to zoom into a section of the entire radio link path depicted at section 302*a*. A user is able to highlight a portion 303 on the radio link path depicted in section 302*a* for closer assessment of that portion on the display at section 302*b*. It will be appreciated that different methods of selecting a portion of the path in section 302*a* to zoom into are possible including using parallel vertical markers to partition the area that the user wishes to zoom into, or entering the latitude/longitude coordinates. When a segment is selected by the user, the path design tool provides, in section 302*b*, an expanded view of the selected segment. The expanded view provides a greater resolution of the surrounding clutter and terrain, enabling a user to better take measurements such as latitude/longitude and elevation. For example, a user may zoom into the path extension regions in order to better evaluate potential alternative sites for tower placement such as elevated sites which reduce required tower height or to steer away from hazards (e.g., bodies of water).

Although this description is based on point-to-point links, a person having ordinary skill in the art will appreciate that the same methodology for displaying points around fixed antenna sites that would result in radio signal paths that meet the radio link budget equally applies to point-to-multipoint radio links.

In some embodiments, the size or geometry of the displayed grids and the number and distribution of spatial points within the grids may be based on the processing capacity of the design tool. For example, the number of points within the grid may be determined based on the processing time required for design tool to compute the alternative path profile between each point in the grid around site A 310 and each point in the grid around site B 320. The configuration interface 315 may allow for input of this maximum processing time or the administrator of the design tool may fix this time such that it is not user configurable. For example, if the processing time is input, selected, or fixed to 10 seconds, the design tool would include as many points within the grids as it may compute the path profile for within 10 seconds. For example, if given the processing power of the processor running design tool, design tool can only process 2,401 paths in 10 seconds, design tool might specify a maximum of 49 points in the grid around site A 310 and 49 points around the grid around site B 320.

While this patent document and attached appendices contain many specifics, these should not be construed as limitations on the scope of any disclosed methods or of what may be claimed, but rather as descriptions of features that may be specific to particular embodiments of particular disclosed methods. Certain features that are described in this patent document and attached appendices in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

We claim:

1. A computer readable non-transitory medium storing instruction that when executed by a processor in a computing system, cause the computing system to perform a method of assessing the suitability of alternative antenna placement sites for radio communication, the method comprising:
  receiving a first proposed location of a first radio antenna and a second proposed location of a second radio antenna, the first and second radio antennas forming a radio link;
  determining a first plurality of points spatially distributed in a regular pattern based on one or more parameters around the first proposed location of the first radio antenna, determining a second plurality of points spatially distributed In a regular pattern based on one or more parameters around the second proposed location of the second radio antenna, wherein the one or more parameters are associated with a dimension;
  computing alternative radio path profiles between each one of the points in the first plurality of points and each one of the points in the second plurality of points;
  displaying an aerial view of the path between the first proposed location of the first radio antenna and the second proposed location of the second radio antenna;
  displaying the first plurality of points around the first proposed location of the first radio antenna and second plurality of points around the second proposed location of the second radio antenna, wherein:
    each one of the points in the first plurality of points or the second plurality of points is visually depicted to indicate a suitability of the point as an alternative antenna placement site based on the computed alternative path profiles, and
    the suitability of each one of the points as an alternative antenna placement site is based on whether an antenna placed as the alternative antenna placement site has a radio link that meets a specified path design goal; and
  receiving an indication of a user action for selecting the first proposed location of the first radio antenna or the second proposed location of the second radio antenna and moving the first proposed location or the second proposed location to an alternative antenna placement site In the first plurality of points or the second plurality of points, respectively.

2. The computer-readable medium of claim 1, wherein the method further comprises:
  varying the visual depiction of points in the first plurality of points when the first proposed location of the first radio antenna is being moved; and
  varying the visual depiction of points in the second plurality of points when the second proposed location of the second radio antenna is being moved.

3. The computer-readable medium of claim 1, wherein at least one of the first plurality of points spatially distributed In a regular pattern on and around the first proposed location of the first radio antenna or the second plurality of points spatially distributed in a regular pattern on and around the second proposed location of the second radio antenna is on a grid oriented along the azimuth of the path between the first radio antenna and the second radio antenna.

4. The computer-readable medium of claim 1, wherein at least one of the first plurality of points spatially distributed In a regular pattern on and around the first proposed location of the first radio antenna or the second plurality of points spatially distributed In a regular pattern on and around the second proposed location of the second radio antenna is on a grid oriented in a fixed direction independent of the azimuth of the path between the first radio antenna and the second radio antenna.

5. The computer-readable medium of claim 1, wherein the method further comprises:
  receiving a first length of a first grid enclosing the first spatial distribution of points around the first proposed location of the first radio antenna or receiving a first spacing between points within the first grid enclosing the first spatial distribution of points; and
  receiving a second length of a second grid enclosing the second spatial distribution of points around the second proposed location of the second radio antenna or receiving a second spacing between points within the second grid enclosing the second spatial distribution of points.

6. The computer-readable medium of claim 1, wherein the number of points in first plurality of points and the number of points within the second plurality of points is selected based on the time required to compute the alternative radio path profiles between each one of the points In the first plurality of points and each one of the points In the second plurality of points.

7. The computer-readable medium of claim 5, wherein the number of points in the first grid is independent of the size of the first grid, and the number of points in the second grid is independent of the size of the second grid.

8. The computer-readable medium of claim 5, wherein at least one of the spacing of points within the first grid or the spacing of points within the second grid is respectively proportional to the area of the first grid or the second grid.

9. The computer-readable medium of claim 1, wherein points in the first or second spatial distribution of points are visually depicted with different colors.

10. The computer-readable medium of claim 9, wherein the method further comprises generating a heat map by interpolating colors between the points in the first or second spatial distribution of points.

11. A method to represent the suitability of potential antenna placement for radio communication in a wireless path design tool, the method comprising:
  receiving a first proposed location of a first radio antenna and a second proposed location of a second radio antenna, the first and second radio antennas forming a radio link:
  determining a first plurality of points spatially distributed in a regular pattern based on one or more parameters on and around the first proposed location of the first radio antenna, determining a second plurality of points spatially distributed in a regular pattern based on one or more parameters on and around the second proposed location of the second radio antenna, wherein the one or more parameters are associated with a dimension;
  computing alternative radio path profiles between each one of the points in the first plurality of points and each one of the points in the second plurality of points;
  displaying an aerial view of the path between the first proposed location of the first radio antenna and the second proposed location of the second radio antenna;
  displaying the first plurality of points around the first proposed location of the first radio antenna and second plurality of points around the second proposed location of the second radio antenna, wherein:

each one of the points in the first plurality of points or the second plurality of points is visually depicted to indicate a suitability of the point as an alternative antenna placement site based on the computed alternative path profiles, and the suitability of each one of the points as an alternative antenna placement site is based on whether an antenna placed as the alternative antenna placement site has a radio link that meets a specified path design goal.

12. The method of claim 11, further comprising:

varying the visual depiction of points in the first plurality of points when the first proposed location of the first radio antenna is changing; and varying the visual depiction of points in the second plurality of points when the second proposed location of the second radio antenna is changing.

13. The method of claim 11, wherein at least one of the first plurality of points around the first proposed location of the first radio antenna or the second plurality of points around the second proposed location of the second radio antenna is on a grid oriented along the azimuth of the path between the first radio antenna and the second radio antenna.

14. The method of claim 11, wherein at least one of the first plurality of points around the first proposed location of the first radio antenna or the second plurality of points around the second proposed location of the second radio antenna is on a grid oriented in a fixed direction independent of the azimuth of the path between the first radio antenna and the second radio antenna.

15. The method of claim 11, further comprising receiving at least a first length of a first grid enclosing the first plurality of points around the first proposed location of the first radio antenna, a first spacing between points within the first grid enclosing the first plurality of points, a second length of a second grid enclosing the second plurality of points around the second proposed location of the second radio antenna, and a second spacing between points with the second grid enclosing the second plurality of points.

16. The method of claim 15, wherein at least one of the spacing of points within the first grid or the spacing of points within the second grid is respectively proportional to the area of the first grid or the second grid.

17. The computer-readable medium of claim 1, wherein the specified path design goal comprises whether the radio link is line of sight (LOS).

18. The computer-readable medium of claim 1, wherein the specified path design goal comprises whether the radio link meets a target Fresnel zone clearance.

19. The computer-readable medium of claim 1, wherein the specified path design goal comprises whether the radio link meets a target link budget.

20. The method of claim 11, wherein the specified path design goal comprises whether the radio link is line of sight (LOS).

* * * * *